United States Patent [19]
Bush et al.

[11] Patent Number: 5,214,762
[45] Date of Patent: May 25, 1993

[54] DISK DRIVE ACTIVITY INDICATOR

[75] Inventors: Kenneth L. Bush, Cypress; Ralph S. Perry, Houston, both of Tex.

[73] Assignee: Compaq Computer Corporation, Houston, Tex.

[21] Appl. No.: 616,759

[22] Filed: Nov. 19, 1990

Related U.S. Application Data

[63] Continuation of Ser. No. 268,221, Nov. 7, 1988, abandoned.

[51] Int. Cl.⁵ .............................................. G06F 3/00
[52] U.S. Cl. .................................................. 395/275
[58] Field of Search ................... 360/97, 98; 395/275

[56] References Cited

U.S. PATENT DOCUMENTS

| | | | |
|---|---|---|---|
| H696 | 10/1989 | Davidson | 364/900 |
| 4,210,959 | 7/1980 | Wozniak | 364/200 |
| 4,300,207 | 11/1981 | Eivers et al. | 364/200 |
| 4,334,307 | 6/1982 | Bourgeois et al. | 364/200 |
| 4,348,761 | 9/1982 | Berger | 364/200 |
| 4,535,404 | 8/1985 | Shenk | 364/200 |
| 4,688,166 | 8/1987 | Schneider | 364/200 |
| 4,701,847 | 10/1987 | Nichols | 364/200 |
| 4,734,851 | 3/1988 | Director | 364/200 |
| 4,803,623 | 2/1989 | Klashka et al. | 364/200 |
| 4,839,800 | 1/1989 | Barlow | 364/200 |
| 5,032,308 | 8/1991 | Le et al. | 364/708 |
| 5,084,791 | 1/1992 | Thanos et al. | 360/77.04 |

OTHER PUBLICATIONS

APS Text Search and Retrieval Classroom Manual, USPTO, Nov., 1987, pp. 1-26.

*Primary Examiner*—Arthur G. Evans
*Assistant Examiner*—C. Shin
*Attorney, Agent, or Firm*—Konneker & Bush

[57] ABSTRACT

In a desktop computer, a hard disk drive activity indicator such as an LED is mounted on the front panel, remote from its associated hard disk drive which is mounted in the back of the housing. The LED is triggered in response both I/O writes for addresses reserved for use with the hard disk, and interrupt requests generated by the hard disk drive. Triggering logic on the motherboard of the computer detects these conditions, and a retriggerable monostable multivibrator which activates the LED. The LED is coupled to the triggering logic with by a conductor that need not be added as an additional part or assembly but instead is within an already-existing assembly such as the power supply.

15 Claims, 2 Drawing Sheets

DISK DRIVE ACTIVITY INDICATOR

This is a continuation of application Ser. No. 07/268,221, filed Nov. 7, 1988 now abandoned.

BACKGROUND OF THE INVENTION

This invention relates to digital computers, and more particularly relates to computers having internal hard disk drive units.

Computers of the desktop size for personal or business usage being designed today often include an internal hard disk drive unit providing relatively fast access bulk memory storage for the computer system. Currently, the microprocessors commonly used in computers of this type are 32-bit devices; that is, memory addresses and data take the form of 32-bit binary numbers which can be transferred along correspondingly sized address and data busses in the computer. For this reason, the maximum size of (byte addressable) main memory in these machines is $2^{32}=4$-Gigabytes.

Even though an address range of 4-Gbyte is available, 32-bit computers are not provided with a fully-populated main memory; this much memory is of prohibitive size and cost, and is not needed for typical business applications. Instead, 32-bit machines may include only 1- or 2-Mbyte or so of DRAM storage, and may employ techniques of virtual memory management, such as "demand paging" to increase the effective size of the DRAM. In one typical way of using virtual memory techniques, the storage facilities provided by I/O modules such as disk drives are merged with the main memory address space to form a larger "virtual memory space". The virtual memory space is subdivided into numerous "pages" or "segments" of either fixed or variable size. At any one time, only a limited sub-set (one or more) pages or segments can be stored in the main memory DRAM of the computer, while the remaining portions of the virtual address space are stored on disk. By performing "page swapping", the storage facilities of the disk drive can be used to provide a very large memory space for the processing unit at a cost that is significantly less than if the same size memory was implemented entirely with DRAM devices.

Computers today most often have an architecture based on the Von Neumann model of computation, characterized by the storing of instruction words and data within a single, common memory space. In such "single store" computers, therefore, the execution of one machine-level instruction may involve several accesses to main memory. A single ADD instruction, for example, might require one memory access to obtain the ADD opcode, one or more memory accesses to obtain each of the two operands to be added, and one memory access to store the result. Clearly, the execution of an entire program can involve a great many memory accesses.

Since only a portion of the entire virtual memory space can be stored in main memory at one time, some memory accesses will be requested for which the desired location must first be read from the disk drive and stored in a main memory, location, replacing data previously stored there. Typically, a computer's operating system (and perhaps hardware associated with the microprocessor) performs the function of coordinating the efficient swapping of virtual memory pages between main memory and disk storage.

Typically, desktop or portable computers with disk drive units are provided with means such as an L.E.D. (light emitting diode) for indicating when the disk drive is "active", i.e., currently engaged in storing or retrieving data. Since most operations executed by the computer require access to some portion of memory, a disk drive activity indicator can give a computer user a relative measure of the efficiency of the computer's virtual memory management and a general idea of the amount of computing activity currently taking place in the computer. In extreme cases, a disk drive activity indicator could alert a user to potential problems with a computer or computer program, such as when indicating a complete lack of activity, or when indicating an overloading of the system. Some users rely upon the LED indicator light as a rough check on the proper operation of the computer or indication of the progress of the applications program being executed. For example, if the user executes a "save file" operation, and the LED does not light up to show that the file has been saved to disk, then the user is alerted to look for the reason.

Disk drive units can be located external to a desktop computer, connected by a cable, or inside the computer's housing, connected directly to a the mother board by ribbon cable. Since "floppy disk" drives and the like must be readily accessible to the user for the insertion of disks, computers are usually designed with a front-facing panel arrangement for the internal mounting of these disk drives.

Hard disk drives, on the other hand, need not be readily accessible during normal operation of the computer, since they usually do not have removable storage media. Nonetheless, hard disk drives are also commonly found mounted near the front of a computer, perhaps near or taking the place of a floppy disk drive. When mounted in such a location, a disk drive activity indicator, such as a light-emitting diode (LED) or the like, can be an integral part of the disk drive itself and still be readily visible to the user. The activity indicator may be attached to one of various points within the circuitry of the disk drive assembly so that it is automatically activated in response to any drive activity.

If a hard disk drive were installed on the side or rear of a computer's housing, however, an activity indicator light mounted directly on the disk drive would not be visible to the user, and therefore would be of little or no use. Accordingly, a drive not mounted in a user-visible location must be provided with a remotely-located activity indicator on or near the front of the computer housing.

In response to the increasing and widespread popularity of desktop size computers, computer manufacturers have made significant advances in the design and manufacturing techniques for their products, enabling them to maximize productivity while minimizing cost of production. Surface-mount technology (SMT) devices and flow-soldering techniques have led to partially or fully automated computer assembly lines. Such advances have resulted in smaller, more reliable and less expensive computers. For this reason, it is particularly undesirable to include in a computer a disk drive activity indicator on the front panel that requires a wire to connect it to a rear-mounted disk drive. Such a design would have the effect of slowing the assembly process for the computer and increasing both the parts cost and the assembly cost.

As an alternative to having a wire that directly connects an indicator LED to a rear-mounted disk drive, the LED could instead be connected to some other system component that is closer to the desired location of the LED, provided that the LED was still triggered in response to drive activity. For example, the indicator could be attached directly to the motherboard of the computer, near the front of the computer and visible to the user through an appropriately positioned aperture in the computer's front panel. In one prior method, such an LED is coupled to a bit position in a dedicated register on the motherboard; the operating system disk driver routines set this bit just before every disk drive access, and reset the bit upon completion of the access. In this way, the indicator LED is mounted, without additional wire, directly to the motherboard, and can accurately reflect disk drive activity.

A disadvantage to the external indicator light implementation just described, however, is that the triggering of the LED is dependent upon an explicit single-purpose action that does not by necessity occur with each disk access. That is, it is possible for disk driving software to initiate a disk access without setting the bit in the dedicated register, whereas with a drive having an internally connected indicator LED, access to the drive is typically not possible without activating the indicator LED.

It is accordingly a feature of the present invention to provide a drive activity indicator located in a position remote from the drive unit itself; another feature is that this indicator is triggered, without explicit action being taken by the CPU, in response to any drive activity. It is a further feature of the present invention that installation of the activity indicator does not require a dedicated, direct connection between the indicator and the drive. An additional feature is the provision of a remote indicator light, useful for rear-mounted hard disk drives or the like, which does not increase the parts cost or assembly cost by any significant amount.

SUMMARY OF THE INVENTION

According to one embodiment of the present invention, a disk drive activity indicator is provided which is activated in response to an action that must occur in order for disk access to occur. The activity indicator has no direct connection to the disk drive unit, making the present invention well suited to computers designed so that the disk drive is not normally visible to the user. In one embodiment, a hard disk drive activity indicator which is mounted remotely from its associated hard disk drive is triggered in response both to I/O writes to addresses reserved for use with the hard disk, and to interrupt requests generated by the hard disk to the processor. Triggering logic situated on the computer's motherboard includes logic which detects these conditions, as well as a retriggerable monostable multivibrator which activates the indicator during low-going pulses on its output. While the hard disk drive itself may be situated in the rear of the computer, the indicator is mounted in a location readily visible to a user, and is coupled to the triggering logic output with a wire that follows a pre-existing route within the computer. For example, in one construction, a power supply unit is mounted inside the computer housing in a position such that the front of this unit is adjacent the front panel, so the LED can be positioned on the front of the power supply unit; the power supply is of course connected to the motherboard by a ribbon cable, so another conductor can be included in this already-existing ribbon cable at almost no cost, and this conductor routed to circuitry on the motherboard which generates the activity signal discussed above. Therefore, no additional hardware is added to the computer assembly, although some added circuitry is included in existing component parts.

BRIEF DESCRIPTION OF THE DRAWINGS

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

DETAILED DESCRIPTION OF A SPECIFIC EMBODIMENT

Figure 1:
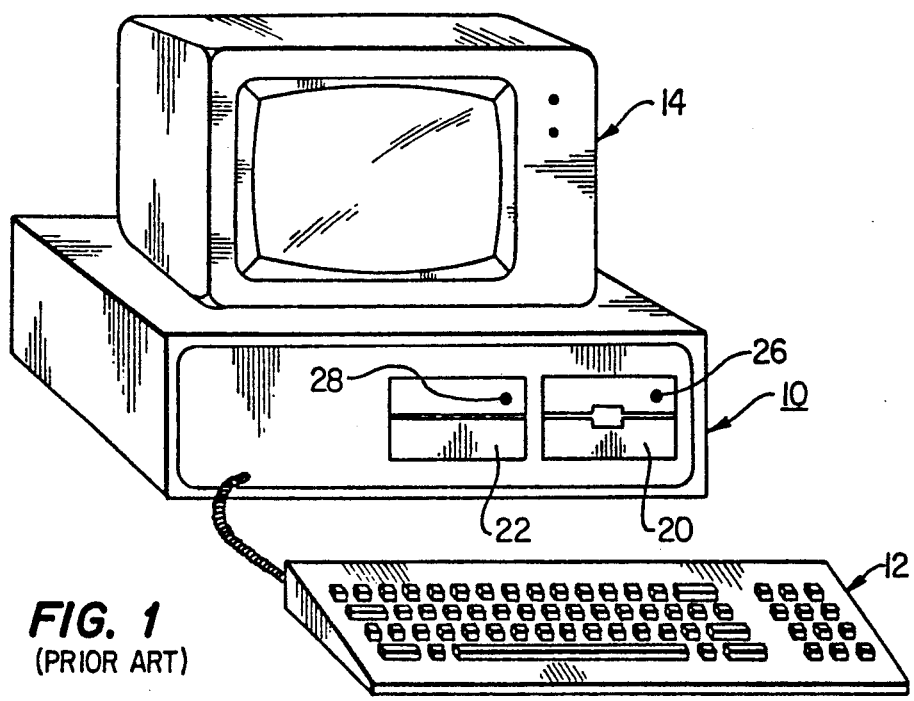
FIG. 1 is a pictorial view of a prior art desktop computer system.
Figure 2:
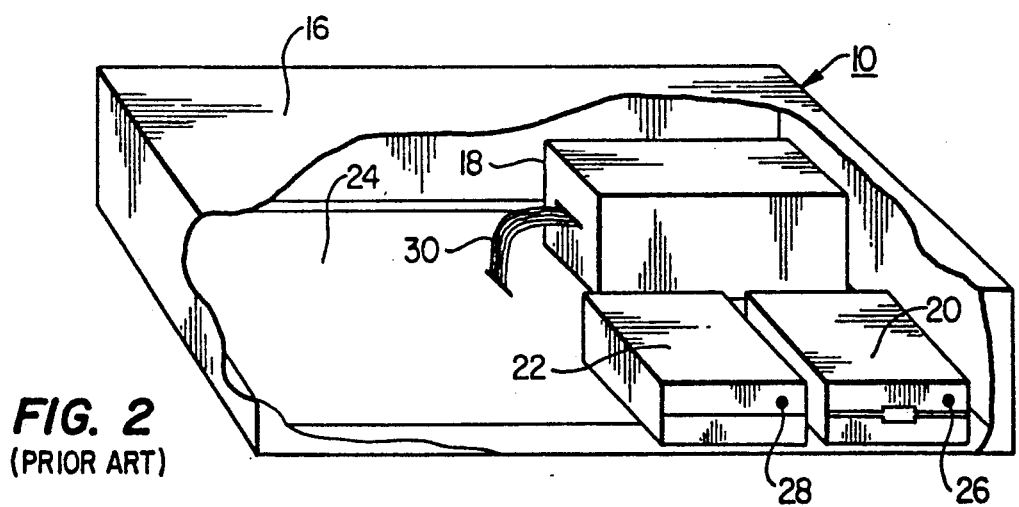
FIG. 2 is a more detailed pictorial view, cut away, showing the arrangement of internal components in the computer of FIG. 1.

Referring to FIG. 1, a desktop sized computer system of the prior art is illustrated. The system consists of three major components: a computer housing 10 (sometimes called the "system unit"), a keyboard 12, and a video display unit 14. These three units are usually connected together by cables. A more detailed cutaway view of the computer housing 10 is shown in FIG. 2, revealing the internal components. The computer housing 10 usually consists of a metal box 16 containing a power supply 18 usually mounted in the rear, and a floppy disk drive 20 and a hard disk drive 22 mounted in the front. In addition, the housing contains the computer motherboard 24, on which is located a majority of the logical circuitry for the computer 10 including a central processing unit, main memory facilities, and so on (circuitry not shown in FIG. 2). Power to various components on the motherboard 24 is provided from the power supply 18, which is connected to the motherboard via a multi-conductor cable 30, such as a flexible ribbon cable or the like.

In the computer of FIG. 2, the floppy disk drive 20 and hard disk drive 22 are located generally near the front of the housing 16, so that the front of each of the drives 20, 22 is accessible to the front panel; a user must have access to the floppy disk drive to insert disks, while the hard drive is mounted in a position where a floppy drive could be mounted. Each of the drives 20, 22 is equipped with an LED activity indicator 26 and 28, respectively; these LEDs are activated in response to the accessing (either reading or writing) of data stored on the respective drives 20, 22. Since in FIG. 2 the drives 20, 22 are located near the front of the housing 16, the activity indicators 26, 28 are directly attached to the corresponding drives 20, 22 and can be made visible to users by providing appropriately positioned holes in the front panel of the computer housing 16 or in a bezel on the front of each of the disk drive units themselves.

Figure 3:
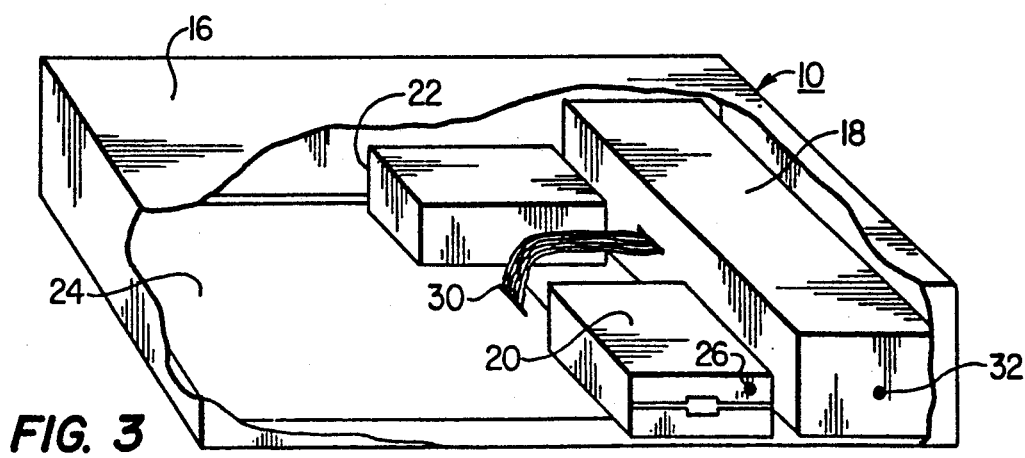
FIG. 3 is a detailed pictorial view like FIG. 2 showing an alternate arrangement of internal components in the computer of FIG. 1, modified to employ the remote indicator of the invention.

FIG. 3 shows a computer system unit 10 similar to FIGS. 1 and 2 but with an arrangement of computer components within the housing 16 using features of the present invention, in which elements which are the same as in FIG. 2 have retained identical reference numerals. In the computer of FIG. 3, the floppy disk drive unit 20 remains situated near the front of the computer, as in FIG. 2, facilitating convenient insertion and removal of floppy disks. The hard disk drive 22, however, is located generally in the rear of the computer. In this position, an indicator mounted directly on the disk drive 22 could not be made easily visible to a user through an opening in the front of the housing 16. The LED indicator for the rear-mounted hard disk drive 22 of FIG. 3 is mounted externally to the hard drive, in close proximity to the front of the housing 16. Referring to FIG. 3, an external LED indicator 32 is shown mounted directly in the front panel of the power supply unit 18, so that the indicator 32 is positioned within an appropriately positioned hole in the front face of the computer housing 16.

Figure 4:
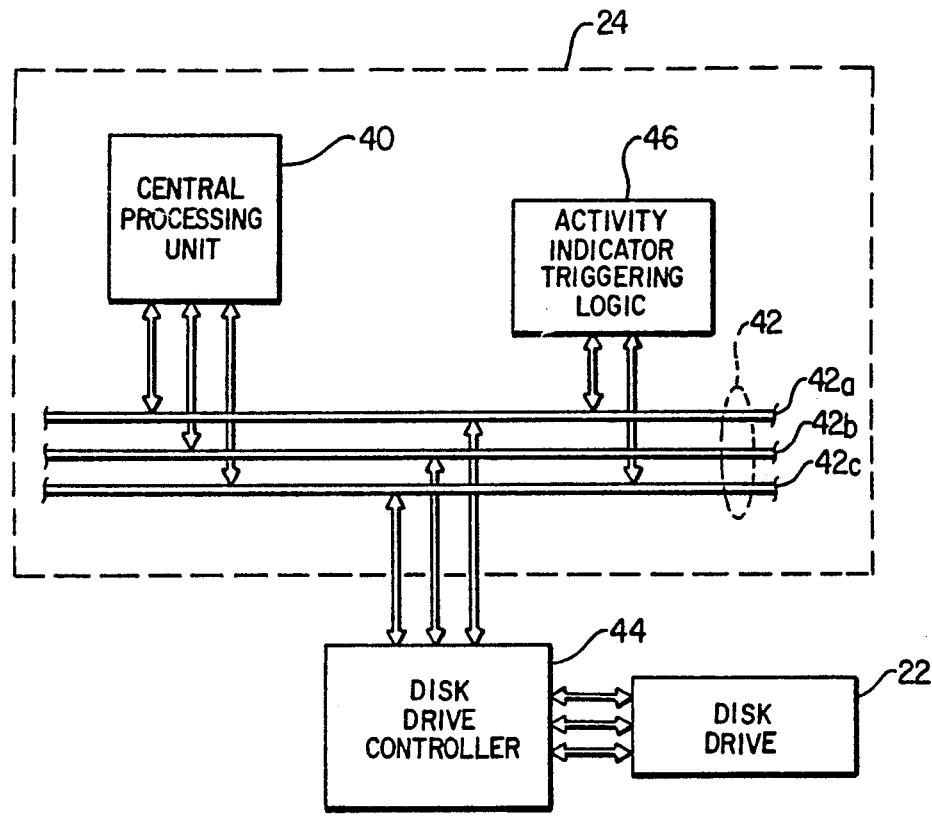
FIG. 4 is an electrical diagram in block form of the computer of FIG. 3.

FIG. 4 is a simplified block diagram of the computer 10 of one embodiment of the present invention. The computer 10 includes a central processing unit 40, such as the 80386 microprocessor manufactured by the Intel Corporation, Santa Clara, California. This CPU 40 employs a system bus 42 having twenty-four (or up to thirty-two) address lines 42a, thirty-two data lines 42b and a plurality of control/power lines 42c. In this embodiment, the CPU 40, the system bus 42 as well as additional circuitry (not shown) are situated on the motherboard 24.

As shown in FIG. 4, the hard disk drive 22 is interfaced to the system bus 42 by means of drive controller logic 44. In the current embodiment of the present invention the disk drive 22 is an I/O mapped device, accessed by reading and writing to reserved locations in the I/O space of the processor 40. Communication between the processor 40 and the disk drive 22 proceeds as follows: When the CPU 40 requires information to be read from or written to disk, it informs the disk drive 22 by writing appropriate request information to registers in the disk drive controller 44 which are mapped into the I/O space of the CPU 40. Once the drive 22 has accepted the read or write request information, it will perform the requested disk access. When the drive 22 has completed the disk access, the drive controller logic 44 informs the processor that the operation is complete by asserting a specified one of the interrupt input lines to an interrupt controller for the microprocessor of the CPU 40, namely IRQ14, which are included as part of the control/power lines 42c. In the case of disk read access, the receipt of the IRQ14 indicates to the processor 40 that it should enter a routine to receive the requested data from the disk drive via the system data bus 42b. In the case of disk write access, information is sent from the processor 40 to the disk 22 via the data lines 42b.

When mounted externally to the hard disk drive 22, a disk activity indicator 32 must be provided with a triggering signal which accurately reflects drive activity. According to one embodiment of the present invention, the LED indicator 32 is activated in response to either one of two situations, one in which the host processor 40 is accessing the disk drive 22, and one in which the disk drive 22 is interrupting the host processor. Referring to FIG. 4, the system address bus 42a and the processor interrupt lines in control bus 42c are provided as inputs to indicator triggering logic 46 located on the motherboard 24.

Figure 5:
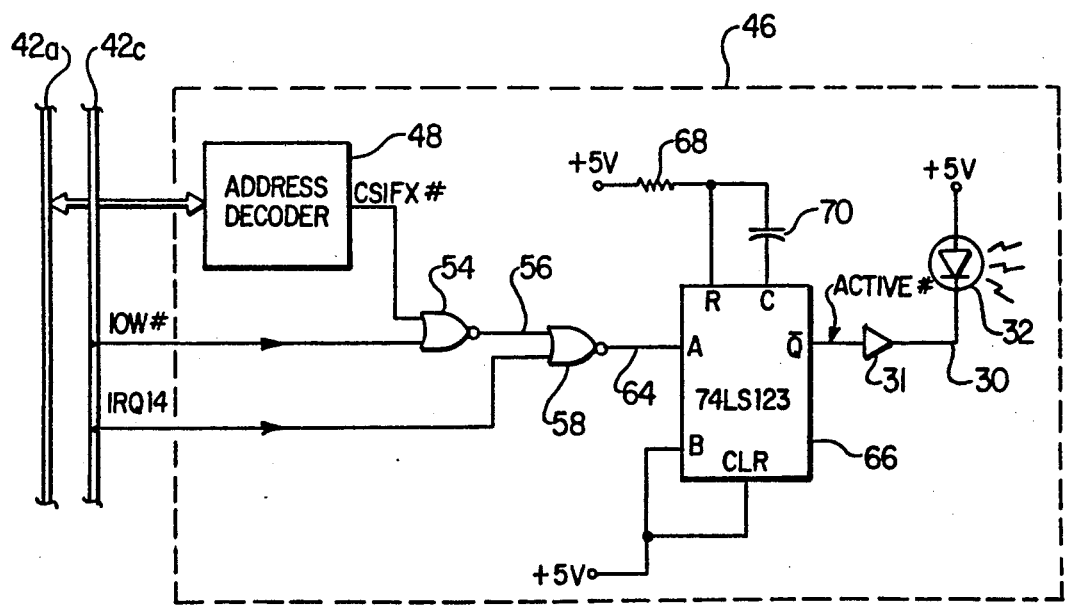
FIG. 5 is a logic diagram of disk activity detection circuitry in the computer of FIGS. 3 and 4.

FIG. 5 shows a schematic diagram of the triggering circuit 46 for the LED indicator 32 of FIG. 3. The address bus 42a is coupled to address decoding logic 48 having an output called CS1FX#. The signal CS1FX# indicates, when asserted (low) that one of the addresses reserved for use with the hard disk's I/O mapped registers is currently being driven on the address lines 42a. Two additional inputs are used by the indicator control logic 46: IOW# and IRQ14. The IOW# signal from the control bus 42c, when asserted (low), indicates that an "I/O write" operation is currently being executed in the I/O address space of the processor 40. IRQ14 is one of fifteen unique processor interrupt requests and is available at an interrupt control circuit. Assertion of each of these interrupt requests initiates the assertion of an INTR input to the processor 40, resulting in the execution of a selected one of a number of different interrupt service routines by the 80386 processor 40. In this example, IRQ14 is the interrupt level reserved (in the present embodiment) to indicate a hard disk drive interrupt request via the interrupt controller.

The two signals CS1FX# and IOW# are inputs to NOR gate 54, and the output 56 of this gate 54 is asserted (high) whenever both CS1FX# and IOW# are asserted (low); therefore, this signal 56 indicates when high that one of the I/O locations reserved for the I/O mapped disk drive registers is being written to. The output 56 is combined with the IRQ14 signal in NOR gate 58, and the output 64 of NOR gate 58 is asserted (low) whenever an I/O write is occurring at locations reserved for hard disk registers or whenever the disk drive 22 is requesting interrupt service from the processor 40. This signal on line 64 is an input to a retriggerable monostable multivibrator 66. In one embodiment, this device 66 is an SN74LS123 multivibrator, manufactured by Texas Instruments of Dallas, Texas, and the input 64 is coupled to the "A" input of this device. As shown in FIG. 5, the "B" and "CLR" inputs to the multivibrator 66 are permanently held in a "high" (logical one) state. With the arrangement described, the output "Q" (referred to as the "ACTIVE#" signal) will drop momentarily to a logical zero state, whenever the "A" input is asserted (low), and then return to a logical one (high) state. The duration of this low-going pulse is determined by the values of the resistor 68 and the capacitor 70 coupled to the "R" and "C" inputs to the multivibrator 66.

The operation of the indicator triggering logic 46 just described is as follows: Whenever the processor 40 accesses the disk drive register at I/O location 1FX(hex), or whenever the disk drive 22 interrupts the processor 40, the ACTIVE# signal will momentarily pulse from its normally high (logical one) level to a low (logical zero) level. The ACTIVE# signal is used to trigger the LED indicator 32 through a high-current non-inverting buffer 31, so that the LED 32 is activated from the +5 V supply during each low-going pulse of the ACTIVE# signal. The pulse width of the ACTIVE# signal defines the length of time the LED 32 stays on; this pulse width was empirically set at approximately 3.6 milliseconds in the example embodiment. The pulse width is selected to produce an indication to the user that seems to coincide with the user's expectation of how long the disk access takes, in a properly operating system; this is a subjective determination.

The ACTIVE# signal is generated on the motherboard 24 as described above, and is routed to the LED 32 mounted on the power supply unit 18 via the plurality of lines 30 (ribbon cable) connecting the motherboard to the power supply. Adding an additional line for this purpose to the lines 30 between the motherboard 24 and the power supply 18 results in little or no increase in the cost of manufacture, since this collection of lines 30 must exist in the computer 10 for supplying the operating voltages to the motherboard regardless of whether or not an extra one of the lines is used for the purpose of a hard disk activity indicator. The LED 32 is wired such that it is activated during low-going pulses of the ACTIVE# signal on the one of the lines 30 used for this signal.

From the detailed description of a specific embodiment given above, it should be evident that an activity indicator for a hard disk drive has been disclosed which is especially well-suited for application in computer systems having a rear-mounted disk drive unit. Having the activity indicator triggered in the manner described above obviates the need for a dedicated line (i.e., a separate part for assembly) running from the rear mounted disk drive to the front panel of the computer. Furthermore the activity indicator described above is triggered in response to actions that must necessarily occur whenever disk activity is taking place, thus preserving the computer's compatibility with various versions of disk operating system software (DOS) which may not otherwise take explicit action to trigger the activity indicator.

Although a specific embodiment of the invention has been described in detail, various alternatives to this embodiment are apparent; for example, an Intel 80386 microprocessor is described above, but computer systems using other microprocessors would advantageously use the invention. Further, the indicator trigger input signals used to determine disk status may be altered according to the type of microprocessor used in the computer, and the specific logical composition of the activity indicator triggering logic may be modified to allow for these different signals or for timing considerations. The values of the resistor and capacitor used to set the timing of the multivibrator may be adjusted to achieve the desired appearance of the indicator LED. Of course, an indicator other than an LED may be employed.

The circuitry shown in FIG. 5 would often be included in a large gate array of programmed array logic (PAL) device containing thousands of gates; a device of this type is usually needed to provide a large number of diverse functions on the motherboard, so the functions of the circuitry of FIG. 5 would be provided at virtually no additional cost.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:
1. A computer system comprising:

(a) a housing having a front panel visible to a user during operation of the computer system;
(b) a circuit board located within said housing;
(c) a CPU located within said housing and mounted on said circuit board;
(d) peripheral I/O means located within said housing, said peripheral I/O means addressable by said CPU;
(e) system bus means located within said housing, said system bus means coupling addresses, data, and control signals between said CPU and said peripheral I/O means;
(f) said peripheral I/O means including:
   (1) a peripheral controller connected to said system bus to receive addresses, data, and control signals from said CPU and to send data and control signals to said CPU, and
   (2) an input/output device disposed within said housing remote from said front panel, said input/output device being operated by said peripheral controller; said peripheral controller defining a plurality of registers addressable by said CPU for transferring data and control signals to and from said CPU and to and from said input/output device;
(g) means, connected to said system bus means, for detecting transfers of address and control signals between said CPU and said peripheral controller via said system bus means;
(h) indicator means, connected to said means for detecting transfers, for informing a user of said computer system of activity by said peripheral I/O means, said peripheral I/O means activity being determined by said means for detecting transfers detecting transfers of address or control signals between said CPU and said peripheral controller via said system bus means, said indicator means activated under control of said means for detecting transfers, and deactivated after a fixed period of time;
(i) said indicator means installed remotely from said peripheral controller and said input/output device.

2. A system according to claim 1 wherein said input/output device is a hard disk drive.

3. A system according to claim 1 wherein said means for detecting transfers includes means responsive to address and control signals being transferred from said CPU to said plurality of registers in said peripheral controller.

4. A system according to claim 3 wherein said means for detecting transfers includes means responsive to assertion of preselected control signals directed to said CPU via said system bus means by said peripheral controller.

5. A system according to claim 1 wherein said indicator means further comprises a light-emitting diode coupled to said front panel.

6. A system according to claim 5 and further comprising a power supply unit located within said housing and extending to said front panel and electrical connection means coupling said means for detecting transfers and said light-emitting diode, said electrical connection means extending through said power supply unit and to said front panel of said computer system.

7. A system according to claim 4 wherein said means for detecting transfers further comprises means responsive to assertions by said CPU of preselected address signals directed to said peripheral controller via said system bus means.

8. A system according to claim 7, wherein said means for detecting transfer comprises:
   (a) an address decoder coupled to said system bus means for producing a first distinctive output signal upon detection of said preselected address signals being coupled on said system bus means between said CPU and said peripheral I/O means;
   (b) digital logic circuitry coupled to said system bus means, said logic circuitry including means for producing a second distinctive output signal upon detection of said preselected control signals being coupled on said system bus means between said CPU and said peripheral I/O means; and
   (c) a retriggerable, monostable, multivibrator, said multivibrator receiving said first and second distinctive signals and producing a triggering signal which activates said indicator means upon receipt of said first distinctive signal and upon receipt of said second distinctive signal.

9. A computer system according to claim 1 wherein said detecting transfers means further comprises:
   means, connected to said address bus, for detecting accesses of said disk drive by said CPU; and
   means, connected to said control bus, for detecting interrupts of said CPU by said disk drive.

10. A computer system comprising:
    (a) a system bus;
    (b) a CPU connected to said system bus;
    (c) a peripheral controller connected to said system bus;
    (d) activity detection means, connected to said system bus, for detecting address and control signals between said CPU and said peripheral controller;
    (e) indicator means, connected to said activity detection means, for informing a user of said computer system when transfer of address and control signals between said CPU and said peripheral controller along said system bus is detected by said activity detection means said indicator means activated by said activity detection means whenever said activity detection means detects transfer of address and control signals along said system bus.

11. A system according to claim 10 wherein said peripheral controller is coupled to a hard disk drive.

12. A system according to claim 10 wherein said system bus carries address, data and control signals between said CPU and said peripheral controller, and wherein said activity detection means indicates activity by said peripheral controller in response to an assertion by said peripheral controller of a preselected one of said control signals indicative of activity by said peripheral controller and directed to said CPU via said system bus.

13. A system according to claim 10 wherein said CPU defines an I/O address space, and wherein said peripheral controller defines a plurality of registers within said I/O address space for transferring data and commands to and from said CPU.

14. A system according to claim 13 wherein said activity detection means is responsive to addresses or commands being written by said CPU into said plurality of registers.

15. A system according to claim 10 wherein said system bus carries address, data and control signals between said CPU and said peripheral controller, and wherein said activity detection means indicates activity by said peripheral controller in response to an assertion by said CPU of a preselected one of said address signals indicative of activity by said peripheral controller and directed to said peripheral controller via said system bus.

* * * * *

UNITED STATES PATENT AND TRADEMARK OFFICE
CERTIFICATE OF CORRECTION

PATENT NO. : 5,214,762

DATED : May 25, 1993

INVENTOR(S) : Kenneth L. Bush, et al.

It is certified that error appears in the above-identified patent and that said Letters Patent is hereby corrected as shown below:

Column 1, line 63, delete ","(first occurrence)

Column 7, line 52, "of" should read --or--.

Signed and Sealed this

Eighth Day of February, 1994

Attest:

BRUCE LEHMAN

Attesting Officer  Commissioner of Patents and Trademarks